United States Patent [19]
Grahn

[11] Patent Number: 5,460,511
[45] Date of Patent: Oct. 24, 1995

[54] ENERGY EFFICIENT AFTERBURNER

[76] Inventor: Dennis Grahn, 1532 California Ave., Palo Alto, Calif. 94306

[21] Appl. No.: 237,677

[22] Filed: May 4, 1994

[51] Int. Cl.⁶ .............................. F23D 14/00; F01N 3/10; B01D 53/34
[52] U.S. Cl. .............. 431/5; 422/173; 422/174; 422/108; 422/109; 422/198; 422/205; 431/7; 431/36; 110/210; 110/211; 110/214; 110/345; 423/210
[58] Field of Search ................... 422/168, 171, 422/172–175, 180, 201, 205, 206, 108, 109, 198; 423/210; 110/210, 211, 214, 345; 165/158, 159; 431/5, 7, 36, 66; 219/263, 264, 425, 430, 439, 441, 442; 392/314, 316, 318

[56] References Cited

U.S. PATENT DOCUMENTS

| | | | |
|---|---|---|---|
| 3,898,040 | 8/1975 | Tabak | 422/171 |
| 4,820,500 | 4/1989 | Obermüller | 110/210 X |
| 5,024,817 | 6/1991 | Mattison | 422/175 |
| 5,179,933 | 1/1993 | McCrillis et al. | 422/182 |

*Primary Examiner*—Robert J. Warden
*Assistant Examiner*—Hien Tran
*Attorney, Agent, or Firm*—Roger Schlafly

[57] ABSTRACT

A small energy efficient afterburner for oxidizing the byproducts of incomplete combustion is disclosed. Gases are forced into a firebox, where a heating element maintains a temperature above the flash point for the more common and undesirable pollutants. Typical temperatures are 500° C. to 800° C. for burning hydrocarbons coming from internal combustion engines or wood stoves. After gases pass through the firebox, they are forced into a chamber adjacent to the firebox intake, so that heat energy may be transferred to the incoming gases, thereby greatly increasing the thermal efficiency of the device. Greater efficiencies are achieved by putting a catalytic surface in the firebox, and by insulating the afterburner exterior.

12 Claims, 5 Drawing Sheets

ENERGY EFFICIENT AFTERBURNER

BACKGROUND

This invention relates generally to pollution reduction, and, more particularly, to the treatment of airborne combustion byproducts.

Air pollution is a major problem in our society. A major source of air pollution is incomplete oxidation of combustion materials in a firebox or combustion chamber. Internal combustion engines, as commonly used in automobiles, provide energy by burning fuel. The energy is highly desirable, but the pollution they produce is not. Likewise, wood burning stoves provide useful heat by burning wood, but incomplete combustion results in the emission of undesirable hydrocarbon and other emission byproducts in the exhaust that they produce. The exhaust stacks of garbage incinerators and coal fired power plants also produce considerable quantities of undesirable emissions.

When organic material is combusted, whether it be in a wood burning stove, a utility power generation plant, an industrial furnace, or an internal combustion engine, one of the unpleasant (and as yet unavoidable) byproducts of the combustion process is the release of suspended particulate matter or hydrocarbon (HC) emissions. HC emissions are the result of partially combusted organic material escaping the combustion chamber before it is completely oxidized to carbon dioxide and water. In the last decade, over 11,000,000 tons of HCs were emitted from combustion sources in the United States each year. Of that total, approximately 65% of the HC emissions were from transportation sources and over 25% were from residential and commercial combustion (i.e., wood burning appliances). If HCs are maintained in a thermal environment above their combustion temperature, then the HCs will be completely oxidized prior to expulsion from the combustion device and the release of HCs eliminated. An added benefit of complete oxidation of the HCs to carbon dioxide and water is that carbon monoxide (CO) would also be oxidized to carbon dioxide, thereby eliminating an additional undesirable emission. To date, no cost effective means of completely eliminating HC emissions has been developed.

In the prior art, a popular device for controlling automobile engine and wood burning appliance emissions is the catalytic converter. It connects to the exhaust pipe and forces the exhaust to pass through a chamber that contains special materials which induce a chemical reaction in the exhaust. One of the special materials acting as a catalyst is platinum, making catalytic converters somewhat expensive to produce. Palladium, rhodium, other rare metals and/or alloys of these metals are also used in the manufacture of catalytic converters. However, catalytic converters do not remove all of the pollutants, and there is demand for less polluting automobiles and, thus a novel exhaust treatment system.

There have also been afterburners which combust the unburned or partially burned carbon compounds in the exhaust of an automobile. These have not been popular primarily because of the large amount of energy required to heat the exhaust to the point of combustion.

This invention uses a counter current heat exchanger. Such heat exchangers are commonly used in industrial furnaces to transfer waste heat from exhaust gases to incoming combustion gases. For heat exchange theory and examples of heat exchangers see Holman, J. P., *Heat Transfer* (7th edition)., New York: McGraw-Hill, Inc., 1990. In most industrial settings there is a large energy input to the system from the furnace burners so heat exchange efficiency between the exhaust gases and combustion gases is not a high priority. In fact, in many applications the primary purpose of the heat exchanger is to cool the exhaust gases rather than preheat the combustion gases.

Accordingly, there is a need for energy efficient devices which can reduce air pollution.

SUMMARY

The present version of this invention is a device for removing undesirable pollutants from the exhaust stream of small, mobile and stationary combustion devices. These undesirable pollutants, which result from the incomplete oxidation of organic materials within the combustion device, such as a wood burning stove or an internal combustion engine, might include hydrocarbons and carbon monoxide. Sometimes nitrous and sulfur oxides also occur, as well as other pollutants. Within this device is a combustion chamber, or firebox, which burns these gases and other airborne organic particles, resulting in relative harmless emission of carbon dioxide and water.

Exhaust from a combustion device is conveyed via a plexus of tubing into a firebox. The exhaust entering the firebox is heated by gases exiting the firebox to close to their combustion temperature. A heating element in the firebox heats the exhaust stream to a temperature above the flash point for the undesirable pollutants, typically 600° C. to 800° C. The undesirable organic components of the exhaust stream will combust in the firebox and be oxidized to carbon dioxide and water.

An air intake combines external air with the exhaust, so that the gases have enough oxygen for complete combustion when they enter the firebox.

The tubes leading to and from the firebox are geometrically configured so that heat transfer can easily take place. The hot gases coming from the firebox transfer some of their heat across the tubing walls into the incoming exhaust, thereby reducing the load on the heating element in the firebox. The thermal efficiency is further enhanced by an insulating material which surrounds the entire device.

The efficiency of this afterburner is largely a result of the counter current heat exchanger. The gas current coming out of the firebox runs counter to the incoming exhaust, facilitating heat exchange. The input and output gas currents are in different chambers and do not actually mix, but they are separated only by stainless steel or a similar heat conductor, so that heat is readily transferred from the output gas to the input gas. The key to the success of this system is to maintain all of the heat generated by the afterburner within the afterburner by maximizing the heat exchange surface area between the input and output gases.

The heating element is preferably powered by a generator associated with the engine or other device producing the exhaust. It is controlled, preferably, by a thermostat which maintains the firebox within a temperature range suitable for combustion of hydrocarbons and other such pollutants.

Thus, this afterburner has the advantage that it is inexpensive, efficient, and dramatically reduces airborne pollutants such as hydrocarbons.

BRIEF DESCRIPTION OF THE DRAWINGS

These and other features, aspects, and advantages of the present invention will become better understood with regard to the following description, appended claims, and accompanying drawings, where:

Figure 1:
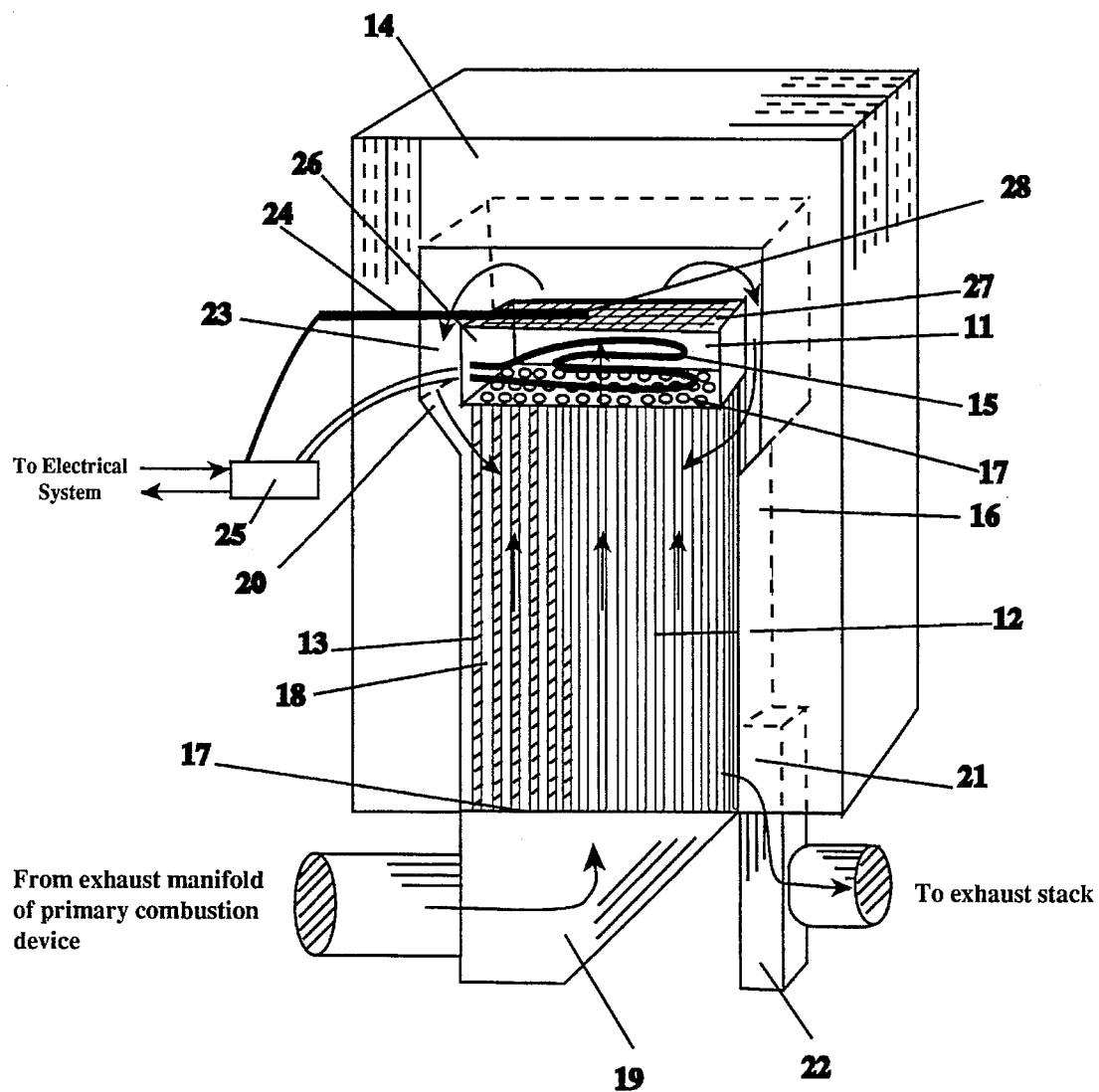
FIG. 1. An exposed view of the internal mechanisms of the exemplary afterburner.

| Reference Numerals in Drawings |
| --- |
| 11 combustion chamber |
| 12 heat exchanger |
| 13 stainless steel tubing |
| 14 insulation |
| 15 heating element |
| 16 shell |
| 17 heat exchanger end plates |
| 18 heat exchanger open space |
| 19 intake adapter |
| 20 heat exchanger inlet ports |
| 21 exhaust port |
| 22 exhaust adapter |
| 23 combustion chamber exit channels |
| 24 thermocouple |
| 25 temperature control unit |
| 26 baffles |
| 27 stainless steel screen |
| 28 thermocouple housing |
| 29 venturi effect projection |
| 30 exhaust pipe |
| 31 negative pressure area |
| 32 auxiliary air inlet tube |
| 33 fan |

DETAILED DESCRIPTION

This is a design for an energy efficient afterburner for combustion devices which can eliminate HC emissions from the exhaust stream of such a device. A self-sustaining local hot spot is generated in the exhaust flue of the combustion device in which HCs are oxidized to carbon dioxide and water before being expelled from the system. Insulation prevents heat loss directly to the surrounding environment, while a counter current heat exchanger conserves heat within the system by passing the heat from the gases exiting the hot spot in the afterburner to those gases entering the afterburner. The flow tubes within the heat exchanger are arranged to maximize this thermal exchange. Such a device can dramatically reduce the HC emissions without a substantial input of external energy.

Figure 2:
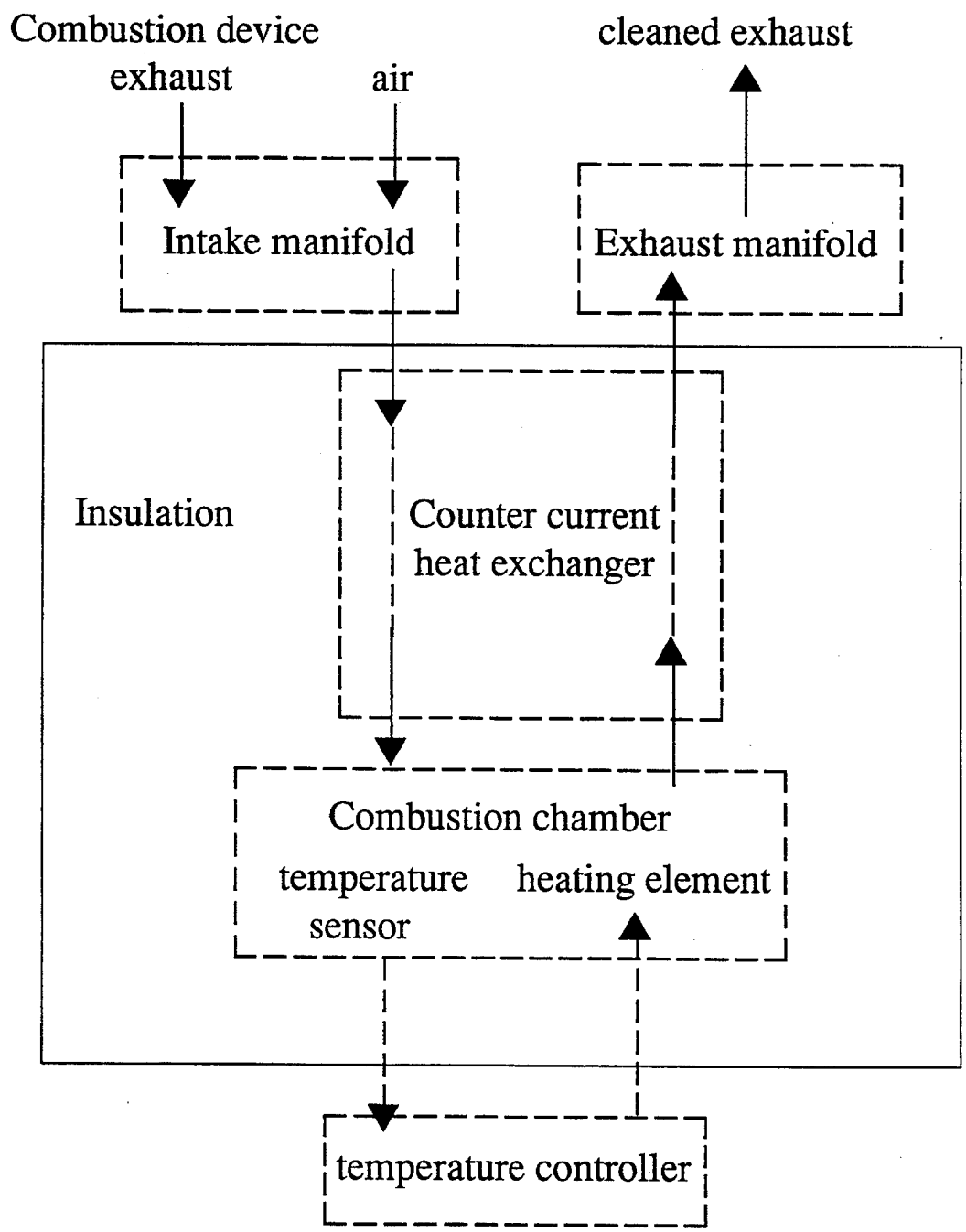
FIG. 2. A schematic block diagram of an afterburner.

A block diagram showing the major functional components of the afterburner is shown in FIG. 2. Combustion device exhaust flows into an intake manifold, along with air. The combined gases flow through a counter current heat exchanger and into a combustion chamber. A temperature sensor measures the temperature of the combustion chamber and signals an external temperature controller, which then powers a heating element so as to keep the combustion chamber within a desired temperature range. Gases burn in the combustion chamber, sending byproducts back into the counter current heat exchanger where they transfer heat to gases coming in from the intake manifold. The byproducts eventually exit through an exhaust manifold as cleaned exhaust.

Figure 3:
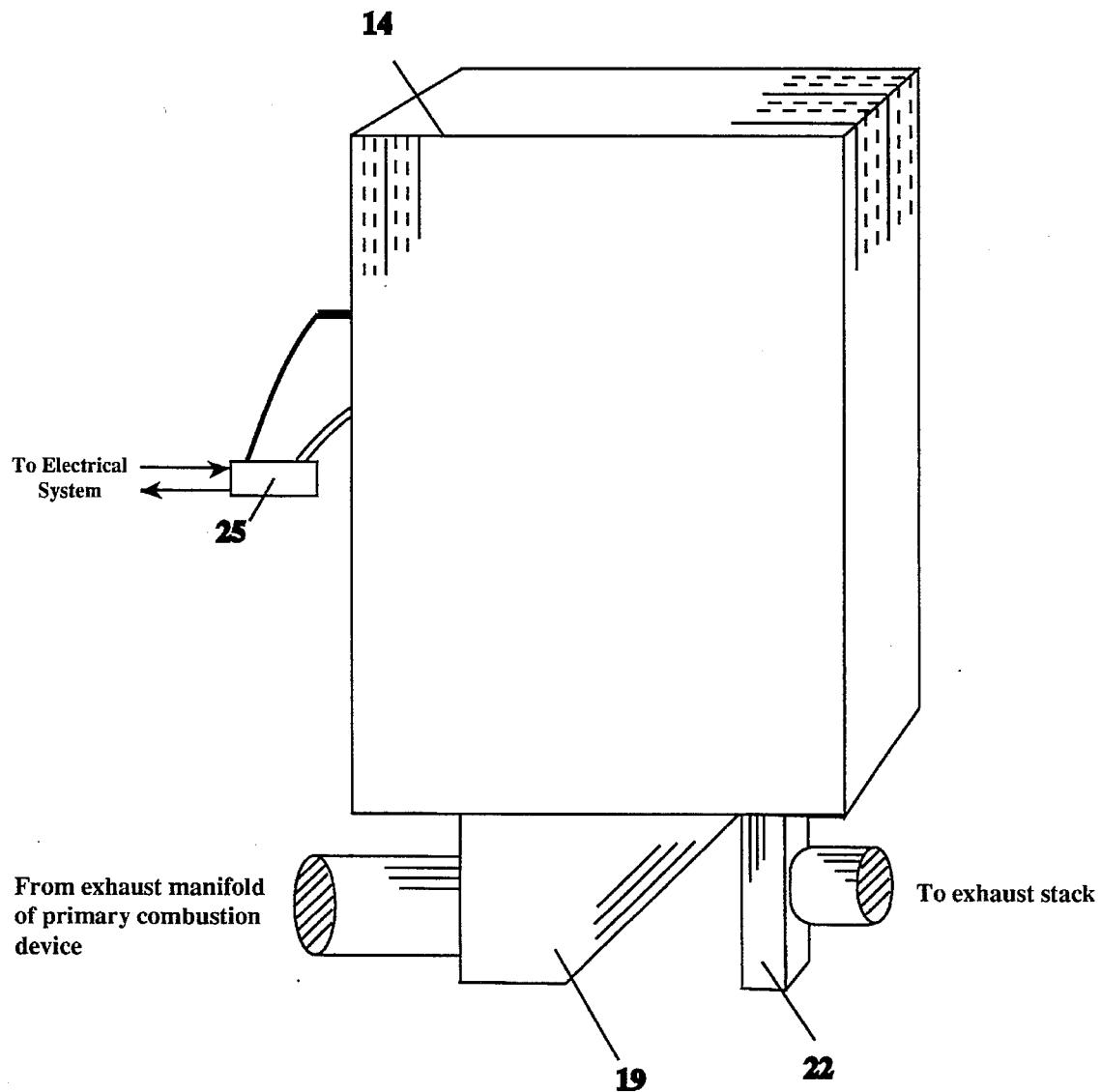
FIG. 3. An external view of the exemplary afterburner.
Figure 5:
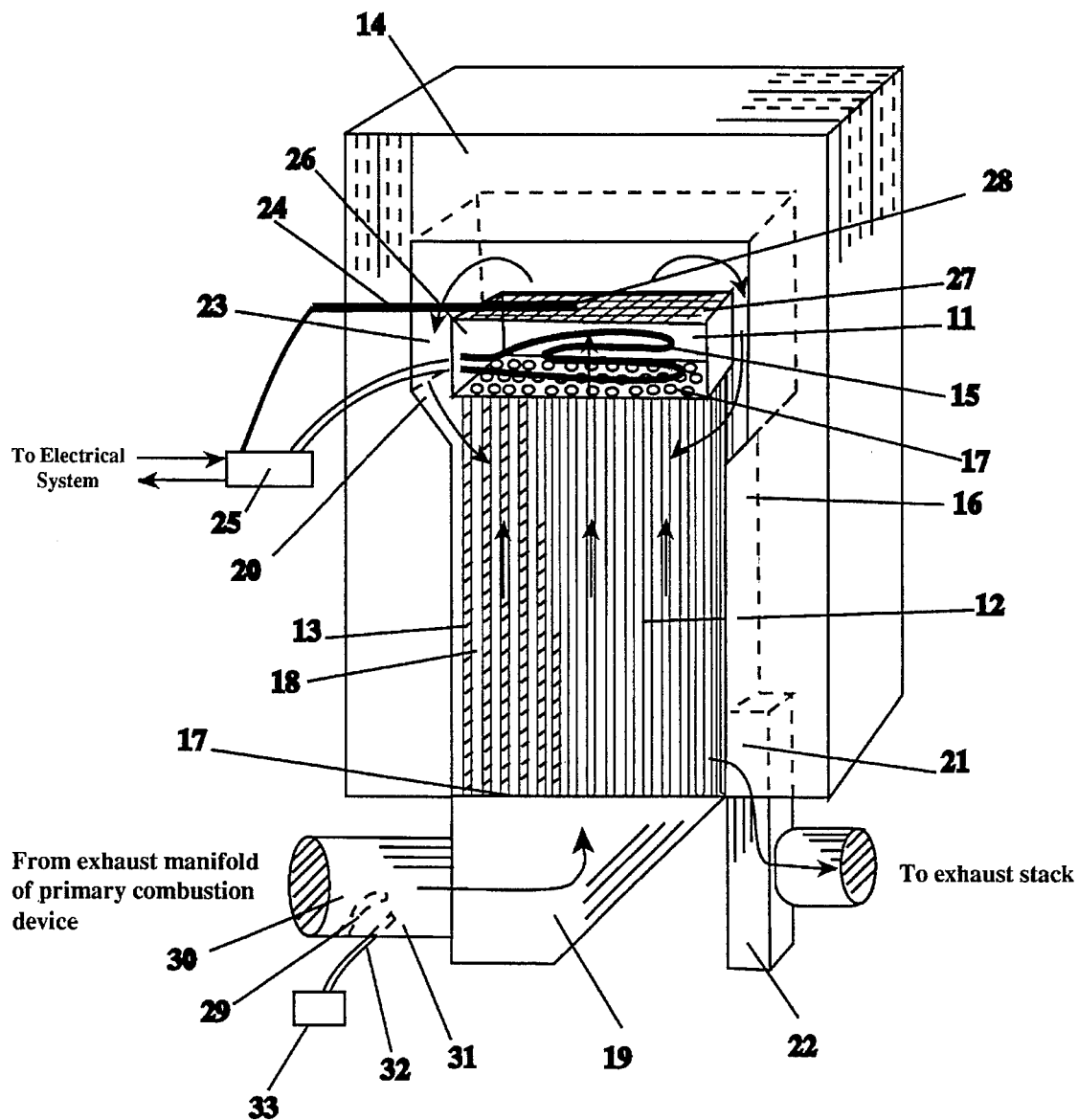
FIG. 5. A exposed view of the exemplary afterburner with an auxiliary air intake.

An exterior view of an exemplary afterburner is shown in FIG. 3. Cut-away views, described in detail below, are shown in FIGS. 1 and 5. The only difference between FIGS. 1 and 5 is that FIG. 5 has venturi air intake.

The afterburner, as illustrated in FIG. 1, consists of two parts: a secondary combustion chamber 11 (or firebox) and a counter current heat exchange system 12. The heat exchanger 12 consists of a plexus of small diameter tubing 13 through which the exhaust stream from the primary combustion device (e.g., an internal combustion engine or a wood burning stove) is preheated, by extracting heat from spent gases, before it enters the secondary combustion chamber 11. The external surfaces of the afterburner, illustrated in FIG. 3, are insulated by insulation 14 to prevent heat loss to the environment. The heat exchanger 12 and insulation 14 allow the temperature of the gases entering the combustion chamber 11 to approach the temperature of the gases exiting the combustion chamber 11, and, thus, the heat generated in the combustion chamber 11 is conserved in the afterburner. Ideally, all of the heat generated in the secondary combustion chamber 11 is transferred to the incoming gases. Realistically, recovery of 85% of the heat exiting the secondary combustion chamber 11 is an accomplishment. A small heating element 15 installed in the secondary combustion chamber 11 is necessary to enable initial generation of the hot spot and to maintain desired combustion chamber temperature. However, once the device has reached a stable thermal state, the device is mostly self-sustaining as the energy generated by the combustion of the HCs within the afterburner offsets the heat lost through the insulation 14 and not captured by the heat exchanger 12. The efficiency of the counter current heat exchanger 12, and the insulation 14 surrounding the afterburner, determines the energy needs of the system.

Since the area of the heat exchange surface determines the efficiency of the heat exchange, the objective is to maximize the surface area contact between the incoming and outgoing gases and minimize the surface contact with the outside environment. The counter current heat exchanger 12 is a shell and tubing design constructed out of parallel aligned thin walled stainless steel tubes 13 mounted in an insulated shell. The shell 16 is constructed out of 18 gauge stainless steel plate. The side walls of the shell are solid. The end plates of the shell 17 are corrugated with holes spaced so that the total open area approximates the area of the remaining surface.

Figure 4:
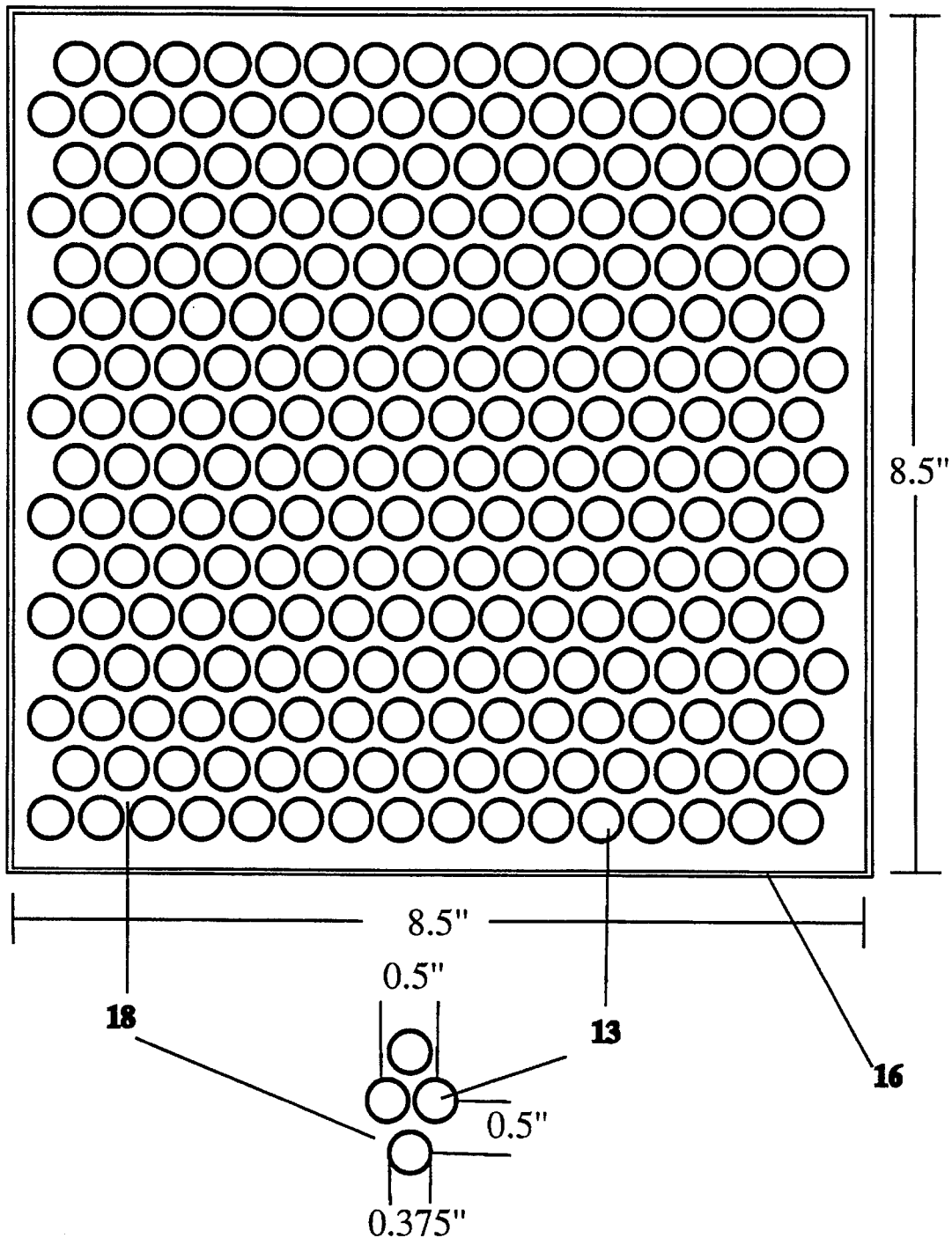
FIG. 4. A cross sectional view of the heat exchanger element.

A means of increasing surface area without increasing volume and disrupting the flow in a closed stream is to increase the number of pathways while decreasing the diameter of each pathway. The exhaust stream from the primary combustion device is diverted into numerous parallel aligned small diameter stainless steel tubes 13. A 6" diameter exhaust stack has a cross sectional area of 28.26 sq. in. To approximate that area, the heat exchanger requires 256 ⅜" tubes 13 as illustrated by a cross-sectional schematic diagram in FIG. 4. The heat exchanger uses 384' of ⅜" thin wall stainless steel tubing installed in a 8.5"×8.5"×18" (inside diameter) shell. Eighteen inch sections of stainless steel tubing 13 are mounted on ½" centers. The stainless steel tubing is welded into the shell so that both ends of the tubing penetrate the end plates of the shell 17 and the air inside the tubes is isolated from the surrounding space inside the heat exchanger.

The exhaust from the firebox flows up the heat exchanger 12 into the secondary combustion chamber 11 through the tubing 13, while the gas stream exiting the secondary combustion chamber 11 flows in the opposite direction through the heat exchanger via the open spaces 18 surrounding the tubing. The exhaust from the primary combustion source (e.g., a internal combustion engine) is directed into the stainless steel tubing 13 through an intake adapter 19 welded to the perimeter of one end plate 17 of the heat exchange unit. The adapter 19 is configured so that the open end fits snugly over the exhaust stack of a primary combustion device. The gases exiting the secondary combustion chamber 11 enter the heat exchanger 12 through two ports 20 in the walls of the heat exchanger 12 immediately below the secondary combustion chamber 11. Spent gases exit the heat exchanger 12 through an exit port 21 immediately above the end plate 17 through which the untreated primary combustion device emissions enter the heat exchanger 12. The spent gases pass through a second adapter 22 into the existing exhaust stack. These inlet 19 and outlet 22 adapters can be easily modified to fit any size of tubing.

The secondary combustion chamber 11 consists of a modified rectangular box sitting on top of the heat exchanger 12. The combustion chamber 11 has inside dimensions of 9" wide, 13" wide, and 7" deep. A 9"×8.5" opening is centered in the base. The combustion chamber is positioned so that the heat exchanger 12 extends 2.5" into the combustion chamber through the 9"×8.5" opening. The overlap of the combustion chamber 11 and the heat exchanger 12 places the heat exchanger ports 20, through which the gases expelled from the secondary combustion chamber 11 enter the heat exchanger 12, within the confines of the combustion chamber 11 enclosure. The preheated gases enter the combustion chamber 11 directly from the heat exchanger tubing 13. The spent gases exit the combustion chamber 11 via two 8"×2" channels 23 descending from the top of the combustion chamber 11 and mating with the upper ports 20 in the walls of the heat exchanger 12.

The secondary combustion chamber 11 houses a thermocouple sensor 24 for a temperature control unit 25, the regulated heating element 15, and a series of baffles 26 to direct the gas flow through the chamber. The heating element 15, a 1200 watt electric stove surface heating element, is flange mounted to an outside wall of the combustion chamber 11. All electrical connections are external to the walls of the combustion chamber 11. An 8"×8" square of stainless steel screen 27, installed directly above the heating element, traps heat in the combustion chamber 11 and serves as a catalytic surface for the HCs. A thermocouple sensor 24, housed in a sealed stainless steel tube 28, is mounted directly above the heating element. The signal from the thermocouple 24 provides input to the heater control unit 25 which, in turn, regulates the power supplied to the heating element 15 and maintains a constant thermal environment inside the secondary combustion chamber 11. Baffles 26 inside the combustion chamber 11 direct the gases out of the heat exchanger tubes 13, through the heating element 15 and the stainless steel screen 27, and back into the open spaces 18 surrounding the tubes 13 in the heat exchanger. Two 8.5×2" baffles 26 are welded atop the walls of the heat exchanger 12 directly above the ports 20 through which the gases exit the combustion chamber 11. This arrangement forces the incoming gas to pass through the heating element 15 and stainless steel screen 27 (the hottest spot in the system) before exiting the combustion chamber 11.

To insure that most of the heat generated in the afterburner is maintained within the afterburner, the entire device must be well insulated from surrounding room air. The possible insulation alternatives are limitless. The prototype device is insulated with 2" of ceramic board insulation 14. Alternatives include other materials with low thermal conductivity, or a vacuum chamber, where a near vacuum is maintained by an auxiliary vacuum pump.

Depending on usage, the stainless steel tubing 13 through which the incoming gases pass may clog with soot after extended use. An alternative embodiment may have a detachable heat exchanger 12 for easier cleaning. Other embodiments might use a tube cleaning device that can clean the tubes without removing the heat exchanger 1:2, chemical cleaning agents, or the use of tubing 13 constructed out of low adhesion materials.

In an alternate embodiment, the screen 27 is coated with a special catalytic material for reducing the activation energy for the pollutants. This allows combustion in the firebox to take place at a lower temperature. Materials known to be effective are platinum, rhodium and palladium. These are quite expensive, so the screen is preferably made of steel with a thin coating of the catalyst. The lower combustion temperature, made possible by the presence of a catalyst, can greatly increase the efficiency of the afterburner. It may also render the heating element 15 unnecessary because, with the catalytic surface, the heat generated by the exhaust may be sufficient to combust a useful portion of the pollutants. This embodiment can be viewed as an enhancement of prior art catalytic converters. Even without the heating element 15, combustion in the firebox 11 will generate heat and the heat exchanger 12 of this invention will transfer much of that heat to the incoming exhaust, thereby making more combustion in the firebox possible, and improving the efficiency of the afterburner.

Often the incoming exhaust will have enough oxygen present to fully oxidize the pollutants present, but combustion can be enhanced by adding oxygen from the outside air. Preferably, an air intake, as illustrated in FIG. 5, combines air with the incoming exhaust. A small projection 29 generates turbulence in the exhaust pipe 30, thereby creating a negative pressure area 31 immediately downstream from the projection 29. A tube 32 connects this negative pressure area to the outside air, so that air is sucked into the exhaust pipe 30 and the combined gases flow into the heat exchanger. Alternatively, a fan 33 may be used to force air into the exhaust from the primary combustion source.

A prototype device as described above has been constructed and tested, using the exhaust gases from a catalytic converter equipped 1987 Saab sedan and a pre-catalytic converter 1976 Saab as inputs to the afterburner. Carbon monoxide (CO) and HC levels were measured with a Bear Pace 100 Ambrose infrared bench spectrogram. The temperature of the afterburner was maintained between 450°–475° C. when testing the effects of the afterburner on exhaust from the catalytic converter equipped vehicle, and at 580° C. when testing the afterburner with exhaust from the pre-catalytic converter vehicle. There was a greater than 70% reduction in HC emissions and a greater than 30% decrease in CO emissions when catalytic converter treated exhaust was passed through the afterburner. The temperatures of the inlet air stream ranged from 35°–45° C. while the outlet air stream ranged from 40°–50° C. These results demonstrate that this afterburner design is capable of dramatically reducing HC emissions. The second set of tests, performed on the 1976 pre-catalytic converter vehicle with the afterburner temperature at 500°–580° C., confirm that this afterburner concept is a viable approach to creating a near zero pollution emitting vehicle. The results are summarized in Table 1. The CO emissions are measured in percentage by weight, and the HC emissions are in parts per million (ppm). Part A was based on a 1987 Saab, a car equipped with a catalytic converter. Part B used a 1976 Saab which did not have a catalytic converter. The numbers in parts B.1–3 are averages+standard deviations of six samples. The ">2064" in part B.4 was a measurement that went off the scale of the metering device, and must be regarded as a lower bound for the actual value.

Those skilled in the art will recognize that there are many materials and variations in design details which can accomplish this invention.

The preferred embodiment of this invention attaches to the exhaust pipe of an internal combustion engine of an automobile. The heating element is powered by the same source of electricity used to power headlights, usually a generator or battery.

An alternate embodiment is an afterburner mounted on a wood burning stove. The heating element may be electric or gas.

The invention has been described in its preferred embodiments, but many changes and modifications may become apparent to those skilled in the art without departing from the spirit of the invention. For example, many other geometrical shapes for the afterburner are possible. The scope of the invention should be determined by the appended claims and their legal equivalents.

TABLE 1

Spectrogram analysis of exhaust gases: vehicle (V) vs. afterburner (AB) treated.

A. 1987 catalytic converter equipped vehicle:

| Emissions | V exhaust | AB exhaust |
|---|---|---|
| Normal fuel mixture Lambda sensor disconnected: | | |
| 2350 RPM: CO (%) | 0.42 | 0.05 |
| HC (ppm) | 9 | 0 |
| 780 RPM: CO (%) | 0.14 | 0.0 |
| HC (ppm) | 20 | 0 |
| Rich fuel mixture Lambda sensor disconnected: | | |
| 2350 RPM: CO (%) | 0.42 | 0.01 |
| HC (ppm) | 9 | 7 |
| 780 RPM: CO (%) | 1.24 | 0.88 |
| HC (ppm) | 65 | 12 |

B. pre-catalytic converter vehicle:

1) The effect of the afterburner treatment on HC and CO emissions: idle emissions, engine speed - 950–980 rpm. The values are mean ± standard deviation (s.d.) of six samples.

| | V exhaust | AB exhaust |
|---|---|---|
| HC (ppm) | 23.0 ± 18.05 | 1.1 ± 1.7 |
| CO (%) | 0.994 ± 0.2 | 0.57 ± 0.01 |

2) The effect of combustion chamber temperature on afterburner performance: HC emissions (ppm) at idle speed (900–950 RPM). mean ± s.d. of 60 samples taken at 1 sec intervals

| | HC emissions |
|---|---|
| V exhaust | 17.9 ± 22.34 |
| AB exhaust: | |
| 500° C. | 1.5 ± 3.34 |
| 580° C. | 0.00 ± 0.0 |

3) Total HC emissions in a five min. period - afterburner vs. control: summed HC emissions (ppm sampled at 1 sec intervals) - 5 min. at idle speed.

| | V exhaust | AB exhaust (580° C.) |
|---|---|---|
| Total | 1582 | 0.0 |
| per min | 316.4 ± 22.34 | 0.0 |

4) Effect of afterburner treatment on HC emissions under maximal load conditions: Deceleration emissions. Summed total of 10 samples taken at one sec TABLE 1-continued Spectrogram analysis of exhaust gases: vehicle (V) vs. afterburner (AB) treated.

intervals.

| | V exhaust | AB exhaust |
|---|---|---|
| 2000 rpm to idle: | | |
| Total HCs (ppm) | 909 | 111 |
| peak HCs (ppm) | 169 | 22 |
| 2500 rpm to idle: | | |
| Total HCs (ppm) | >2064 | 715 |
| peak HCs (ppm) | 356 | 95 |

I claim:

1. An afterburner for treating exhaust, comprising:

a firebox comprising a bottom wall having a plurality of firebox holes, side walls, and a top;

a heating coil contained in said firebox, powered by an external electric current;

a temperature control means, including a temperature sensor connected to the firebox, for regulating the heating coil and maintaining said firebox in a temperature range;

an input means for introducing exhaust gas, said input means comprising an inlet port and a wall having a plurality of input holes;

a heat exchanger, comprising a plurality of substantially straight metal tubes, connecting said input holes with said firebox holes, and defining a space around said tubes;

an output for discharging treated exhaust gas, adjacent to said input; and a housing, enclosing said firebox and said heat exchanger, whereby said exhaust gas enters said input means passes through said tubes, enters said firebox through said firebox holes, is treated by oxidation in said firebox, and said treated exhaust exits said firebox through said top, passes outside of said side walls, and through said annular space, in a direction counter to that of the said exhaust gas inside said tubes, and exits through said output.

2. The afterburner of claim 1, wherein said temperature control means is constructed and arranged to maintain said temperature range between 600 and 800 degrees Celsius.

3. The afterburner of claim 1, further comprising an air intake connected to said input.

4. The afterburner of claim 1, wherein said top is composed of a metal screen.

5. The afterburner of claim 1, further comprising a catalyst in said firebox which lowers the temperature required for oxidation of said exhaust.

6. The afterburner of claim 1, further comprising an insulator surrounding said firebox and housing.

7. The afterburner of claim 1, wherein said tubes number at least 50.

8. A method for oxidizing airborne combustion byproducts, comprising:

capturing exhaust gas from an initial combustion process, said exhaust gas having a flash point;

forcing said exhaust gas through an intake connected to a heat exchanger, said heat exchanger comprising a chamber containing a plurality of substantially straight metal tubes, said tubes connected to said intake at a base with a plurality of holes;

forcing said exhaust gas through said tubes into a firebox, said firebox having a bottom wall at top of said heat exchanger and side walls, said bottom wall having a plurality of holes connected to said tubes;

heating said firebox to a temperature above the flash point for said exhaust gas, thereby treating the exhaust gas;

measuring the firebox temperature;

automatically regulating the heat supplied to said firebox so that said firebox temperature stays in a range above said flash point;

forcing said treated exhaust gas through top of said firebox, outside of said side walls, and into said chamber containing said tubes;

forcing said treated exhaust through said chamber in a direction counter to flow of said exhaust gas passing through said tubes, and out an outlet; and transferring heat from said treated exhaust gas in said chamber to said exhaust gas passing through said tubes with sufficient efficiency to enable self-sustainable combustion in the firebox.

9. The method of claim 8 further comprising combining said exhaust with sufficient air to enable complete oxidation.

10. The method of claim 8 further comprising insulating said firebox and said chamber from outside air, so that heat transfer takes place more efficiently.

11. The method of claim 8 further comprising catalytically lowering said flash point temperature coating a surface of said firebox with a catalyst.

12. The method of claim 8 wherein said temperature range is between 600 and 800 degrees Celsius.

* * * * *